United States Patent [19]

Despois et al.

[11] 4,157,730
[45] Jun. 12, 1979

[54] SYSTEM FOR THE STORAGE AND RECOVERY OF HEAT IN A CAPTIVE LAYER

[75] Inventors: Jacques Despois, Viroflay; Francis Nougarede, La Celle Saint-Cloud, both of France

[73] Assignees: Commissariat a l'Energie Atomique, Paris; Societe Nationale Elf Aquitaine, Courbevoie, both of France

[21] Appl. No.: 741,165

[22] Filed: Nov. 11, 1976

[30] Foreign Application Priority Data

Nov. 13, 1975 [FR] France .................. 75 34641
Sep. 6, 1976 [FR] France .................. 76 24070

[51] Int. Cl.² ........................... F28F 27/02
[52] U.S. Cl. ............................... 165/45
[58] Field of Search ............... 165/45; 60/641

[56] References Cited

U.S. PATENT DOCUMENTS

| | | | |
|---|---|---|---|
| 2,461,449 | 2/1949 | Smith et al. | 165/45 X |
| 3,757,516 | 9/1973 | McCabe | 165/45 X |
| 4,022,025 | 5/1977 | Greene | 165/45 X |
| 4,054,175 | 10/1977 | Swearingen | 165/45 |

Primary Examiner—Charles J. Myhre
Assistant Examiner—Theophil W. Streule, Jr.
Attorney, Agent, or Firm—Sughrue, Rothwell, Mion, Zinn and Macpeak

[57] ABSTRACT

Two or more reversible wells open respectively into a "hot" zone and a "cold" zone of a reservoir or captive layer. The water of the layer is circulated within a primary circuit in a first direction corresponding to circulation within an external loop from the "cold zone" wells to the "hot zone" wells and in a second direction corresponding to circulation from the "hot zone" wells to the "cold zone" wells. Indirect heat transfer takes place between the primary circuit and a secondary heating circuit in the first direction or between the primary circuit and a secondary utilization circuit in the second direction, the flow rate within the primary circuit being regulated in both directions.

8 Claims, 9 Drawing Figures

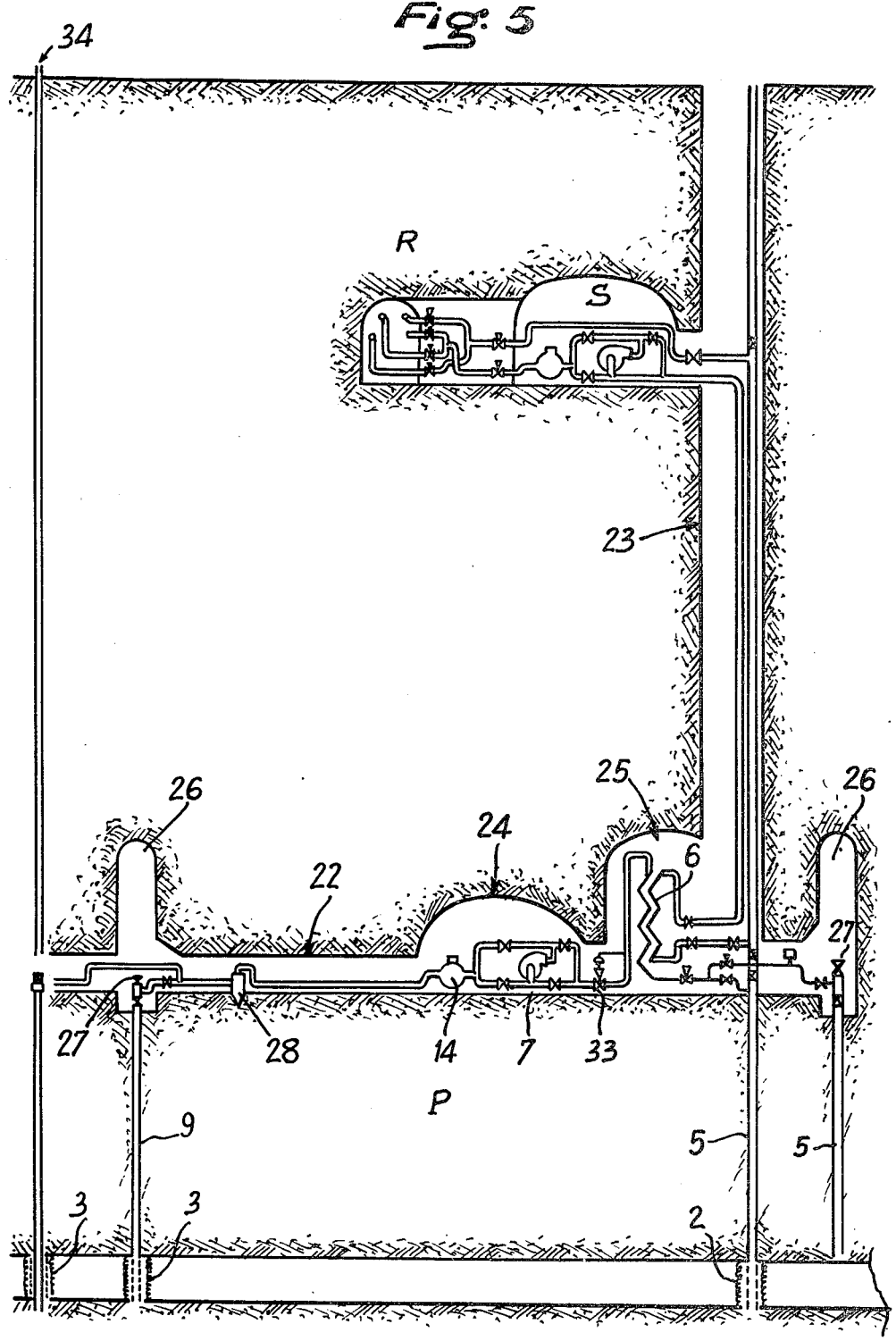

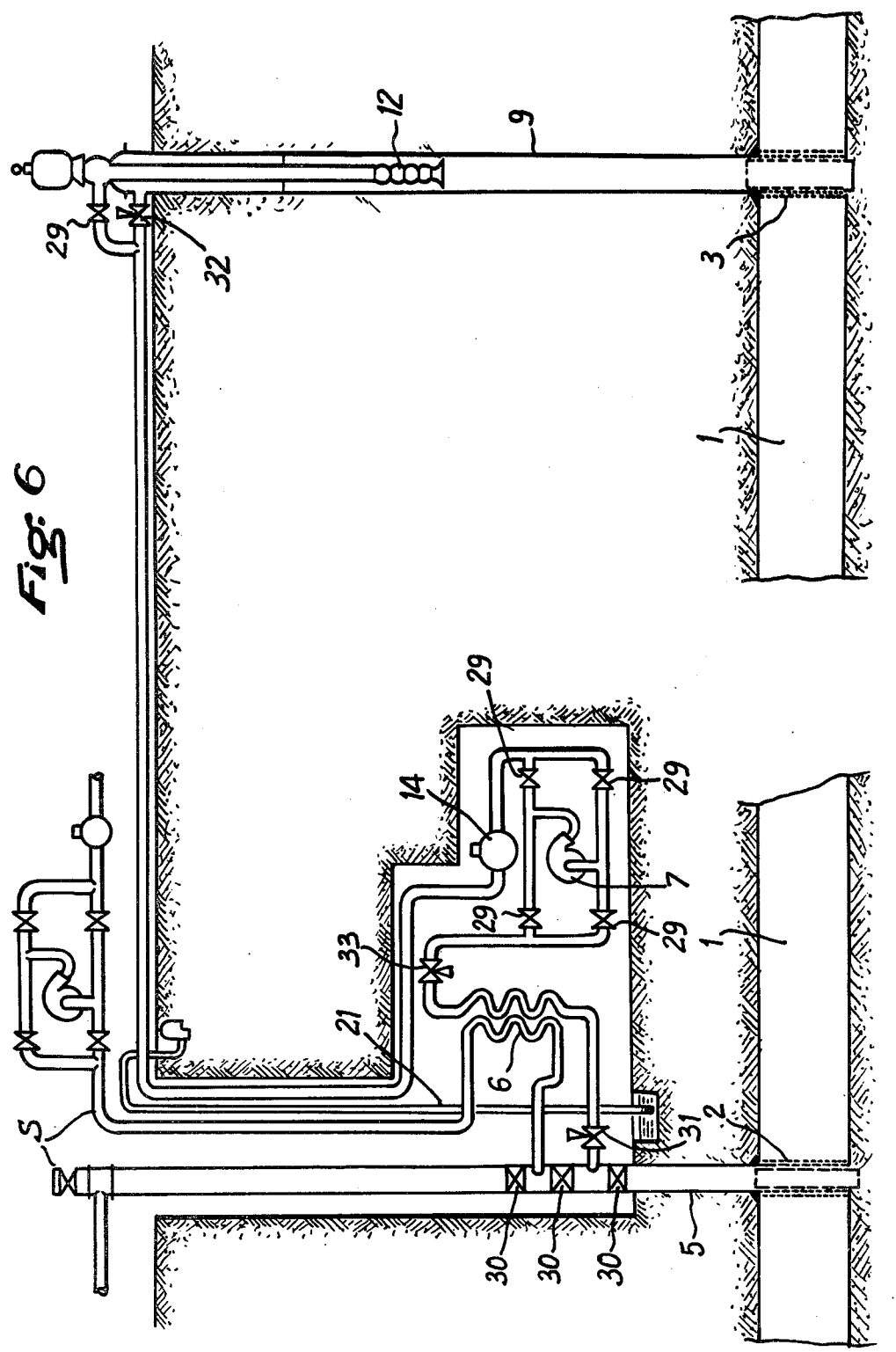

SYSTEM FOR THE STORAGE AND RECOVERY OF HEAT IN A CAPTIVE LAYER

This invention relates to a system for the storage and recovery of heat within the rock matrix of a captive sheet or layer, the retention water which is intimately associated with said layer and accessorily the intergranular free water or "circulation water" contained in said layer.

In more precise terms, the present invention is concerned with a system for the storage and recovery of heat within the rock matrix of a captive layer by heat transfer between said rock matrix and the intergranular free water of said captive layer which receives heat from a hot fluid for heat storage and releases heat to a cold fluid for heat recovery.

In a heat storage and recovery system of this type, the intergranular free water of the captive layer serves mainly to ensure satisfactory heat transfer to the rock matrix at the time of sweeping of this latter at a suitable velocity but also takes part in the heat storage.

In contrast to some methods or devices of the prior art, it is acknowledged in this instance that the practical application of a system of this type presupposes a permeable and porous rock matrix enclosed between impermeable rock walls of sufficient thickness to limit thermal and hydraulic losses and to permit sufficient pressure variations within the layer which are essential in order to ensure suitable circulation corresponding to the desired rate of flow.

It is further assumed that the hydraulic pressure gradient within the layer does not induce an initial field of velocities of the water which is incompatible with the stability of the stored heat.

The heat storage and recovery systems of similar types which have been proposed prior to the present invention have a disadvantage in that they fail to take into account at the same time both the conditions of operation of the wells for heat transfer within the rock matrix and the mechanism of heat losses both within the permeable strata and within the impermeable strata.

As a consequence of the foregoing, the operation of the systems prove neither economical nor reliable at temperatures below 100° C. and proves impossible in the case of higher temperatures.

The present invention is precisely directed to a heat storage and recovery system which makes it possible to overcome the disadvantages of the systems of the prior art.

The heat storage and recovery system in accordance with the invention essentially comprises:

two reversible wells (or a group of wells) which have their openings respectively in a "hot" zone and a "cold" zone of said captive layer, a primary circuit for the water of the layer which is provided with said wells (or group of wells), said layer and a loop which is external to said layer being intended to provide a connection between the well or wells of the "cold" zone and of the "hot" zone, means for circulating the water of the layer within said circuit on the one hand in a first direction corresponding to circulation of the water within said external loop from the well or wells of the "cold" zone towards the well or wells of the "hot" zone and, on the other hand, in a second direction corresponding to circulation of the water within said loop from the well or wells of the "hot" zone towards the well or wells of the "cold" zone, means for indirect heat transfer between said primary circuit and a secondary heating circuit for the first direction of circulation of the water or between said primary circuit and a secondary utilization circuit for the second direction of circulation of the water, means for regulating the rate of flow of the water within said primary circuit for both directions of circulation of the water.

The storage system as essentially defined in the foregoing turns to profitable account the design concept of its primary circuit which is both reversible and completely isolated from each of the secondary heating and utilization circuits.

Thus the system permits in particular:

fully independent operation of each of the aforesaid primary and secondary circuits under optimum conditions of pressure and flow rate, achievement of heat storage or recovery under both low-temperature and high-temperature conditions (temperatures considerably higher than 100° C.) while maintaining the pressure of the circulating water at a value which is higher than the pressure of vaporization of the water at each point of the primary circuit in respect of said temperatures, site location of the heat storage and recovery system both at the surface and either partially or completely underground, the wells (or group of wells) being intended to establish a communication between the captive layer and the surface or a subterranean gallery, safe and reliable regulation of pressures and flow rates within the primary circuit by equipping this latter as a function of the temperature distribution within said circuit independently of the direction of circulation of water (storage or recovery) as a result of the reversibility of the loop, utilization of heating sources of different types such as nuclear reactors, this being made possible by complete isolation of the primary circuit.

In accordance with the invention, the means for circulating the water of the layer within said primary circuit can comprise either means for injecting into the wells both of the "hot" zones and of the "cold" zones or means for extracting from the wells of the "hot" and "cold" zones or injection and extraction means at the same time. Said means for circulating the water of the layer consist solely of means for injecting water both into the well or wells of the "cold" zone and into the well or wells of the "hot" zone when the site location of said heat storage and recovery system is such as to induce artesian flow of said captive layer under a suitable pressure at the level of the external loop of the primary circuit in which the water of the layer is either heated or cooled. In accordance with the invention, the aforesaid injection means comprise at least one injection pump associated with a ring manifold fitted with shut-off valves. Said means preferably comprise a series-parallel assembly of a number of injection pumps each associated with a ring manifold. It is pointed out that said injection pumps are preferably placed within the cold portion of said primary circuit.

The aforesaid means for circulating the water of the layer consist solely of means for extracting water from the well or wells of the "hot" zone and from the well or wells of the "cold" zone when the pressure delivered by these means is sufficient to permit suitable injection within the wells, the pressure drops within the entire primary circuit being taken into account. In accordance with the invention, said extraction means comprise one or a number of pumps for extraction from the well or wells of the "hot" zone and one or a number of extraction pumps from the well or wells of the "cold" zone. Any pump which is designed to extract water from a well of the "hot" zone and placed within the well or within a subterranean gallery at a suitable depth is capable of maintaining the pressure of water at the well-head at a value which is higher than the pressure of vaporization of the water in respect of a given extraction flow rate and a given operating temperature. It is readily apparent that the aforesaid means for circulating the water of the layer are provided if necessary with means for injecting the water into the well or wells of the "hot" zone as well as into the well or wells of the "cold" zone in addition to means for extraction from the well or wells of the "hot" zone and means for extraction from the well or wells of the "cold" zone as mentioned in the foregoing.

In accordance with the invention, the aforesaid means for regulating the rate of flow of the water within said primary circuit for the first and second directions of circulation of water produce action by regulating the pressure at each point of the system by virtue of said circulating means and by employing a set of valves comprising:

for the first direction of circulation of water, a valve (or a group of valves) for regulating the rate of injection into the well or wells of the "hot" zone, for the second direction of circulation of water, a valve (or a group of valves) for regulating the rate of injection into the well or wells of the "cold" zone and a valve (or a group of valves) interposed between the injection means and the heat-transfer means for regulating the flow rate within said primary circuit, taking into account the requirements of good operation of said heat-transfer means.

In the case of operating temperatures above 100° C., the aforesaid valves of the well or wells of the "hot" zone are placed at depths such that the water pressure at the well-head is higher than the pressure of vaporization of the water or associated with an additional valve for regulating the injection rate which is specially intended to control the pressure at the head of each well of the "hot" zone and which can be placed at a suitable depth within each well of the "hot" zone or within a subterranean gallery. At these temperature levels, the extraction means which may be placed within the hot wells take part in the pressure regularization and serve to prevent vaporization.

It should be noted that the means for circulating the heating or utilization fluids are provided for the injection of water into the primary circuit with one or a number of pumps associated with one or a number of ring manifolds.

In order to determine at any particular moment the thermal and hydraulic balance of the heat storage and recovery system in accordance with the invention, each of the primary and secondary circuits is advantageously equipped with a bidirectional water-volume counting system, with pressure and temperature detectors and with a system for controlling flow rates, which are preferably actuated by a management unit for taking into account the availability of or the demand made on the secondary heating and utilization circuits.

Furthermore, in order to locate and if necessary to correct the position of the "hot" storage zone, the heat storage and recovery system according to the invention advantageously comprises in addition auxiliary wells equipped with thermometric and piezometric instruments as well as water extraction and injection elements which are preferably actuated by said management unit.

Moreover, in order to limit heat losses within the aforesaid layer and within the aforesaid impermeable terrains which surround this latter, said wells of the "hot" zone are preferably arranged so as to ensure that the hot water is injected or recovered through at least one well located at the center of the storage area and the wells of the "cold" zone are preferably arranged so as to ensure that the cold water is injected or recovered through wells located at uniform intervals at the periphery of the storage area.

In a homogeneous terrain, the peripheral wells are arranged at intervals for large storages of heat along a circle and are located for small storages of heat on a certain number of the consecutive vertices of a regular polygon.

In a heterogeneous terrain, the wells of the "cold" zone are preferably arranged at uniform intervals on a closed curve defined in polar coordinates by the extremity of a vector, the origin of the vector being located at the center of the storage area and the modulus of the vector being proportional to a parameter which is representative of the heterogeneity of the terrain such as the Darcy transmissivity of the storage area in the direction of the vector.

Further properties and advantages of the present invention will become more fully apparent from a perusal of the following description which relates to examples of construction of the heat storage and recovery system in accordance with the invention, these examples being given by way of explanatory illustration but not in any sense by way of limitation.

In this description, reference will be made to the diagrammatic figures of the accompanying drawings, in which:

FIGS. 4 and 6 illustrate two embodiments of the heat storage and recovery system in accordance with the invention and corresponding to a partially subterranean site location of said system;

FIG. 5 illustrates an embodiment of the system in accordance with the invention and corresponding to a completely subterranean site location of said system;

Figure 1:
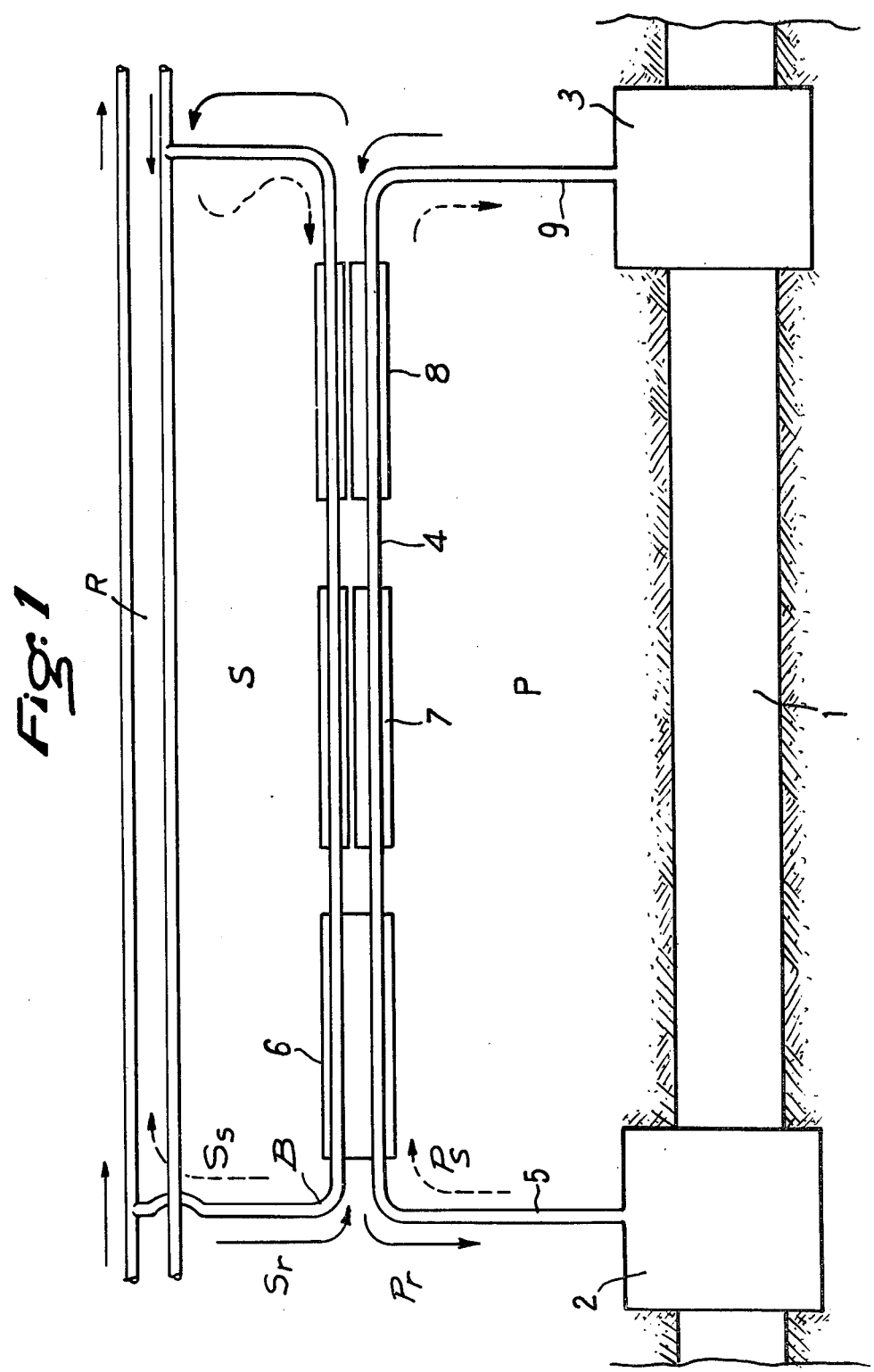
FIG. 1 is a general diagram diagram of the heat storage and recovery system in accordance with the invention.

Referring to FIG. 1, it is seen that the heat storage and recovery system within the rock matrix of a captive layer 1 in accordance with the embodiment shown diagrammatically in this figure is essentially made up as follows:

a primary circuit P in which the intergranular free water of the layer is circulated either in the direction of the arrow $P_r$ or in the direction of the arrow $P_s$ and which comprises the captive layer 1, reversible wells (or a group of wells) 5 and 9 having their openings respectively in a zone 2 of the captive layer which is continuously "hot" at the time of operation of the system and in a zone 3 which is continuously "cold" at the time of operation of said system, a transfer loop 4 comprising heat-transfer means 6 of a type known per se and chosen so as to effect total isolation of said primary circuit P, means whereby the intergranular free water of the layer 1 (not shown in this figure) is extracted from the wells 5 or 9, means 7 for injecting the water into the wells 5 or 9, means for gaining access to the data which are necessary for the storage management and means (not shown in this figure) for regulating the rate of flow within the primary circuit P. (It is recalled that the simultaneous presence within said primary circuit P of said extraction means and said injection means 7 is not essential);

a secondary heating and utilization circuit S formed for example by a loop B connected as a shunt off a distribution system R, there being circulated within said circuit either hot water in the direction of the arrow $S_S$ or cold water in the direction of the arrow $S_R$;

a management unit (not shown in this figure) for heat storage or recovery, this unit being primarily intended to control the different means of the loop 4 according to the availability of the distribution system R or according to the demand made on this latter, said unit being associated if necessary with a set of means (not shown in this figure) for checking and correcting the geometrical position of the stored heat.

It is pointed out that the reversible wells (or group of wells) 5 and 9 are respectively adapted to high hydraulic flow rates of "hot" water and "cold" water both for injection and for withdrawal. The geometrical well location which is dependent on the conditions of the surface site, on the hydraulic characteristics of the captive layer 1 and on the quantity of heat to be stored will be described later with reference to FIGS. 7a, 7b and 8.

Similarly, the equipment in extraction means which may be provided for said wells 5 and 9 and is dependent on the storage temperature, on the hydraulic flow rates, on the depth of the captive layer 1 and on the environmental surface conditions will also be described hereinafter with reference to FIGS. 3 to 6.

It should also be explained that the constructional design of the system according to the invention can be such as to carry out the heat storage by extracting heat from one network and restoring the heat either in parallel or not to another network which is independent of the first. This would apply in particular to an extraction of heat in the form of vapor associated with a restitution in the form of hot water whether pressurized or not.

The heat-transfer means 6 which are intended to permit total isolation of the primary circuit P can be constituted either by a liquid-liquid heat exchanger (or group of exchangers) having separate circuits or by a heat-exchanger (or group of exchangers) having separate circuits and designed to operate as a boiler in the secondary circuit at the time of a heat recovery operation or alternatively by a heat-exchanger (or a group of exchangers) designed to operate as a condenser in the secondary circuit at the time of a heat storage operation.

It is worthy of note that the system of FIG. 1 can be completed by wells which are intended to stabilize the two zones 2 and 3 and are equipped with piezometric and thermometric detectors. A study of piezometric variations serves to guard against drift in the zones 2 and 3 resulting from an initial gradient or a pressure transient within the layer 1 whilst a study of the thermometric variations makes it possible to detect drift arising from variations in specific volume as a result of heat build-up. These auxiliary wells are also equipped with pumps for pumping water into a certain number of wells and re-injection into other wells in order to stabilize the zones 2 and 3 in their theoretical position. This operation can either be performed by hand or be processed by the management unit (not shown in the drawings).

The operation of the system according to the invention as shown in FIG. 1 is as follows. At the time of a heat storage, there is circulated in the zone 3 at the return temperature of the distribution network R the water which is derived from the layer 1, extracted through the well 9, brought to the operating temperature by the heat-transfer means 6 and re-injected into the layer through the well 5 (arrow $P_s$). The heat is stored at 2. During the storage of the heat, the "cold" zone 3 at the return temperature contracts whereas the "hot" zone 2 expands. At the time of a heat recovery, the operation is reversed (arrow $P_r$).

Figure 2:
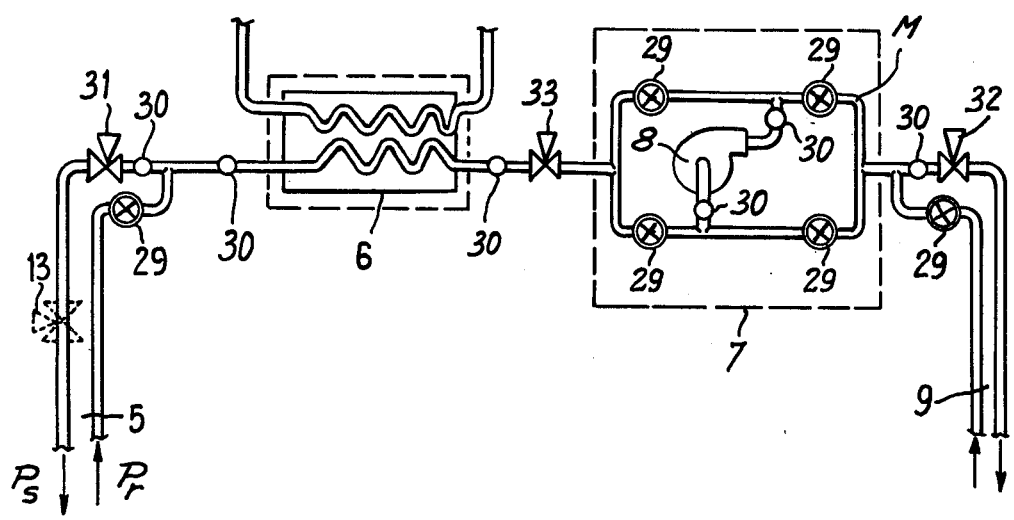
FIG. 2 illustrates the means for carrying out the injection within the well or wells.

It is apparent from FIG. 2 that the means 7 for injection into the wells 5 or 9 comprise a pump 8 associated with a ring manifold M provided with the shut-off valves 29 which are necessary for ensuring reversibility of the primary circuit P. In order to ensure better flow regulation, said injection means 7 will preferably comprise a set of injection pumps which are capable of operating in series-parallel and are associated with a ring manifold.

A point to be noted is the fact that the aforesaid injection means 7 are preferably mounted in said primary circuit P on the cold side.

It is recalled that in certain particular cases, when the pressure delivered by the extraction means provided in the wells 5 and 9 is sufficient when taking account of the pressure drops within the entire circuit P, said injection means 7 can be dispensed with.

Again with reference to FIG. 2, it is apparent that the means for regulating the flow rate within said primary circuit P further comprise the essential shut-off and safety valves 29 and 30 respectively, three regulating valves 31, 32 and 33 (or three sets of regulating valves) so that extraction of water from the wells 5 or 9, heat transfer and injection into the wells 5 or 9 can be carried out simultaneously in a correct manner.

The valve 31 in the injection circuits of the wells 5 is intended to permit flow regulation throughout the primary circuit P at the time of a heat storage carried out in the direction of the arrow $P_s$.

The valve 32 in the injection circuits of the wells 9 and the valve 33 which is interposed between the injection means 7 and the heat-transfer means 6 are intended to permit flow regulation throughout the primary circuit P at the time of a heat recovery operation in the direction of the arrow $P_r$, taking into account the flow conditions within the heat-transfer means 6 and the pressure conditions within the reinjection wells 5.

It is pointed out that, in the case of operation at a temperature above 100° C., the regulating valve or valves 31 aforesaid are either placed at a depth such that, in the case of any flow condition, the head pressure of the wells 5 is higher than the pressure of vaporization of the water at the operating temperature considered or each associated with a valve 13 placed in the injection circuit of the hot wells 5 at a suitable depth and specially intended to maintain the pressure of water at each point of the primary circuit P at a value higher than the pressure of vaporization corresponding to the temperature at this point.

It should further be noted that the means for gaining access to the data which are necessary for storage management preferably comprise a bidirectional water-volume counting system which is suitably installed on the cold side of the primary circuit P, pressure and temperature detectors located on each side of the heat-transfer means 6, injection means 7, and a system for checking the rates of flow in each well.

As is readily apparent, the secondary circuit S of said heat storage and recovery system also comprises the means aforesaid for gaining access to the various data which are necessary for satisfactory operation of the system.

The data supplied by the different devices aforementioned are normally processed automatically by the management unit (not shown) but direct readings can be taken in order to ensure continuity of operation of the system by manual operations if necessary.

Figure 3:
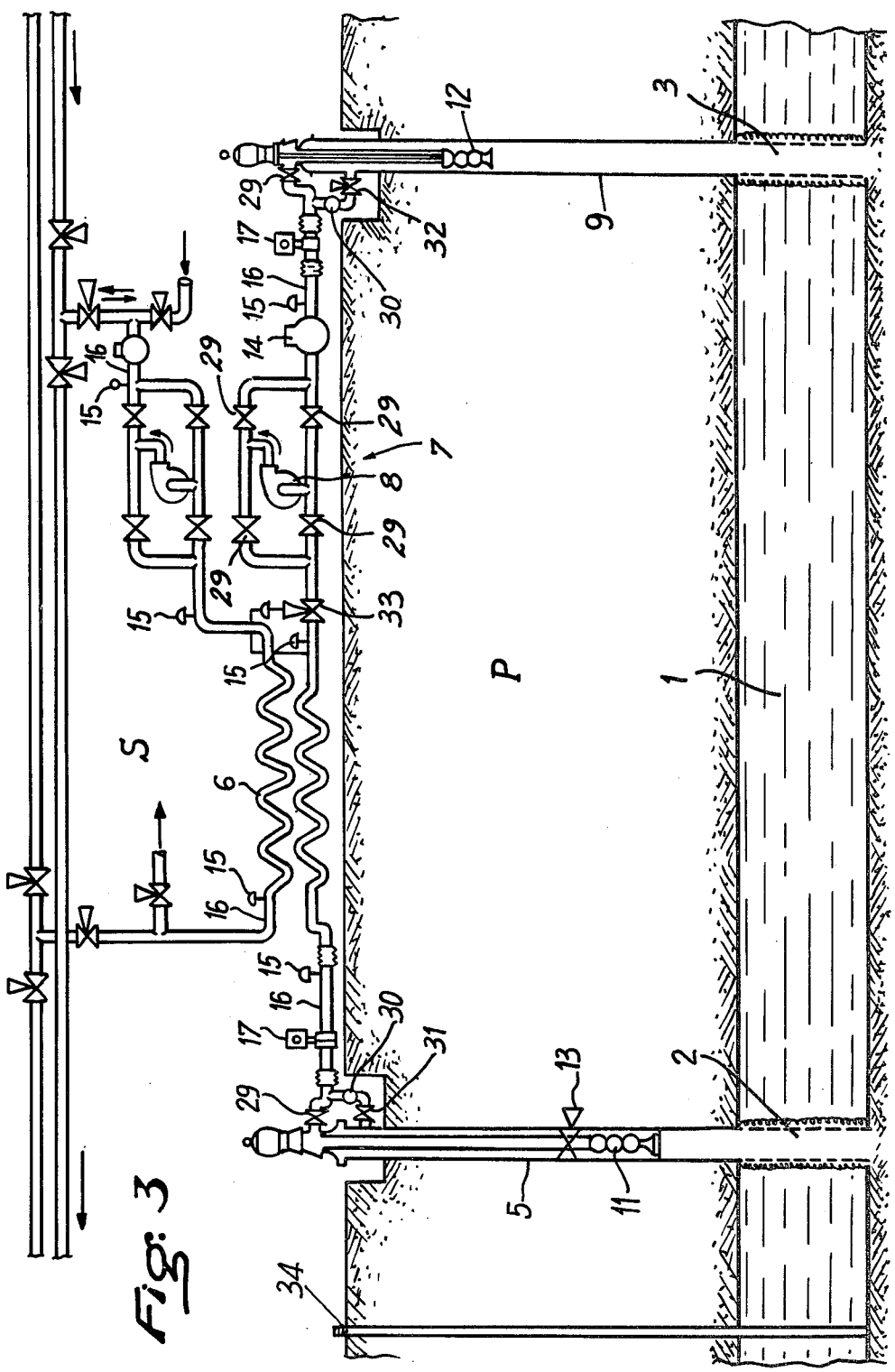
FIG. 3 illustrates one embodiment of the heat storage and recovery system in accordance with the invention and corresponding to a site location which is wholly at the surface.

There is shown in FIG. 3 one embodiment of the system according to the invention and corresponding to a site location which is wholly at the surface. Those components of the system which have already been described with reference to FIGS. 1 and 2 will be designated by the same reference numerals in this figure.

FIG. 3 accordingly shows that the access wells 5 and 9 corresponding respectively to the "hot" and "cold" zones 2 and 3 are bored from the surface.

It can be seen that the transfer loop 4 (shown in FIG. 1) is provided in this case with extraction pumps 11 and 12 placed within the wells 5 and 9, these pumps being of the immersed type with a vertical shaft and a motor at the surface or of the so-called "immersed electric-motor set" type, a bottom valve 13 for regulating the injection pressure within the well or wells 5, the regulating valve 31 installed at the surface in the hot portion of the transfer loop 4.

So far as concerns the well or wells 9, it may be noted that the suitable depth level and the characteristics of the extraction pump 12 comply with accepted engineering standards in accordance with the usual laws of hydraulics. In the case of the well or wells 5, the suitable depth level under conditions in which the extraction pump 11 and the regulating bottom valve 13 have an operating temperature which is higher than 100° C. is so defined that the pressure at the pump inlet always remains higher than the pressure of vaporization of the water at the operating temperature. In consequence, under the dynamic conditions of maximum flow, the water column of the well 5 located between the pump or the valve and the upper limit of the captive layer counterbalances the difference between the dynamic pressure of the captive layer at the level of the well and the pressure of vaporization of the water at the temperature considered. The characteristics of the extraction pump 11 in the case of said well or wells 5 must be such that the well-head pressure is higher than the pressure of vaporization of the water at the operating temperature under all circumstances. In FIG. 3, the reference numerals 14, 15, 16 and 17 designate respectively a bidirectional water-volume counting system, pressure and temperature detectors and a system for checking flow rates.

The site location of the system in accordance with the invention as shown in FIG. 3 has great simplicity and facilitates the accessibility of practically all the components. However, the system calls for the occupation of a relatively large area of ground and cannot readily be adapted to storages at temperatures above 110° C., taking into account the requirements of high reliability of the regulating valves 13.

As a further requirement, the pumps 11 and 12 can only operate within wells in which verticality is ensured with a high order of accuracy.

Figure 4:
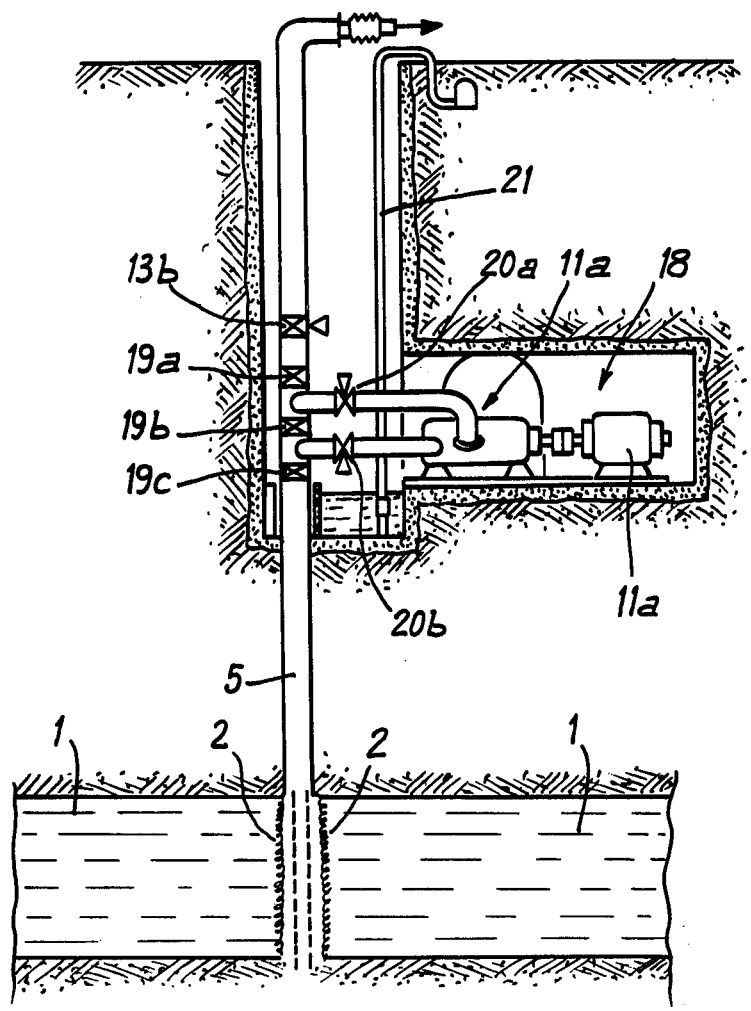

Taking into account the foregoing considerations, it is proposed in the case of very high temperatures to adopt an embodiment of the system according to the invention which corresponds to a partially subterranean site location as shown in FIG. 4.

In the case of a partially subterranean site location as thus contemplated, the surface portion of the transfer loop 4 as well as the equipment of the wells 9 remain unchanged with respect to the design solution shown in FIG. 3 and are not illustrated in this figure. From FIG. 4, it can be seen that the connection between the "hot" zone 2 of the captive layer 1 is carried out as follows. Each hot water extraction pump 11a (which can be of the boiler feed pump type) is placed within an underground gallery or room 18 which intersects the well or wells 5. In each well 5, three valves 19a, 19b, 19c which are placed in position after temporary fitting of a bottom closure member or of a high weight mud plug and resection of the casing strings serve to form a by-pass loop in which is mounted the pump 11a and the pressure-regulating valve or valves 20a, 20b. It is apparent that, in the case of a site location of this type, the injection pressure-regulating valve 13b of standard design can then be mounted in the open air within the gallery 18. The depth of positioning of said valve 13b satisfies the same condition as that of the bottom regulating valves 13 of FIG. 3.

The method of siting adopted for the system in accordance with the invention as shown in FIG. 4 is particularly well suited to temperatures above 110° C. since it is possible by this means to dispense with the constructional requirements and limitations of the extraction pumps 11 and regulating valves 13 which result from the need to instal these latter within the wells 5.

There is shown in FIG. 5 another embodiment of the system according to the invention which corresponds to a wholly subterranean location.

In this method of site construction, the entire primary circuit P is underground whilst the second circuit S is wholly or partly underground.

In consequence, a network of galleries 22 extending from the access well 23 gives access to the room for the injection and primary counting means 24, to the room for the heat transfer means 25, and to the well-head chambers 26.

In the case of both sources, the branch connections with the transfer loop can be formed by resection of the casing strings (as explained earlier) which have been run from the surface or on the contrary by joining to subterranean well-heads 27.

In some cases, provision can be made for desanders 28 in the junction or well lines.

The depth level of the transfer loop must be such that the distance between the base of the galleries and the top of the captive layer is sufficient to ensure safety during construction as well as development and exploitation (impermeability of the terrain, thermal insulation, length of well-cementing, the possibility of well blow-out prevention by injection of high-weight mud).

In the mode of site-location under consideration, it is possible to ensure artesian flow of the captive layer 1 under a suitable pressure at the level of the transfer loop 4 of the primary circuit P. While complying with the requirements mentioned earlier, the level of said transfer line 4 must in that case be such that the hydraulic pressure at the head of a well 5 at the maximum extraction output is higher than the pressure of vaporization of the water.

In the above-mentioned method of siting of the system according to the invention, extraction pumps are therefore no longer provided within each of the wells 5 and 9, bottom regulating valves 13 being similarly dispensed with. Pressure regulation is accordingly carried out by the injection means 7 located in the cold portion of the transfer loop 4 and the regulating valves 31 and 32 located on each side of the heat-transfer means 6.

This mode of site-location permits maximum reduction of the ground area occupied and no longer calls for the presence of extraction pumps, thus considerably simplifying the installation while achieving enhanced reliability.

There is shown in FIG. 6 an alternative mode of site-location of the system according to the invention as shown in FIG. 5, in which the wells 9 are exploited from the surface and equipped with immersed pumps 12 if necessary.

Figure 7A:
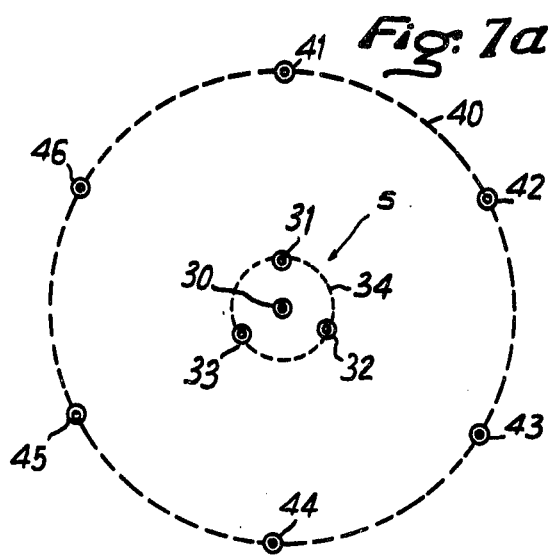
FIGS. 7a and 7b illustrate an embodiment of the heat storage and recovery system in accordance with the invention and corresponding to a preferential arrangement of the wells of the "hot" and "cold" zones for a substantial heat storage.
Figure 7B:
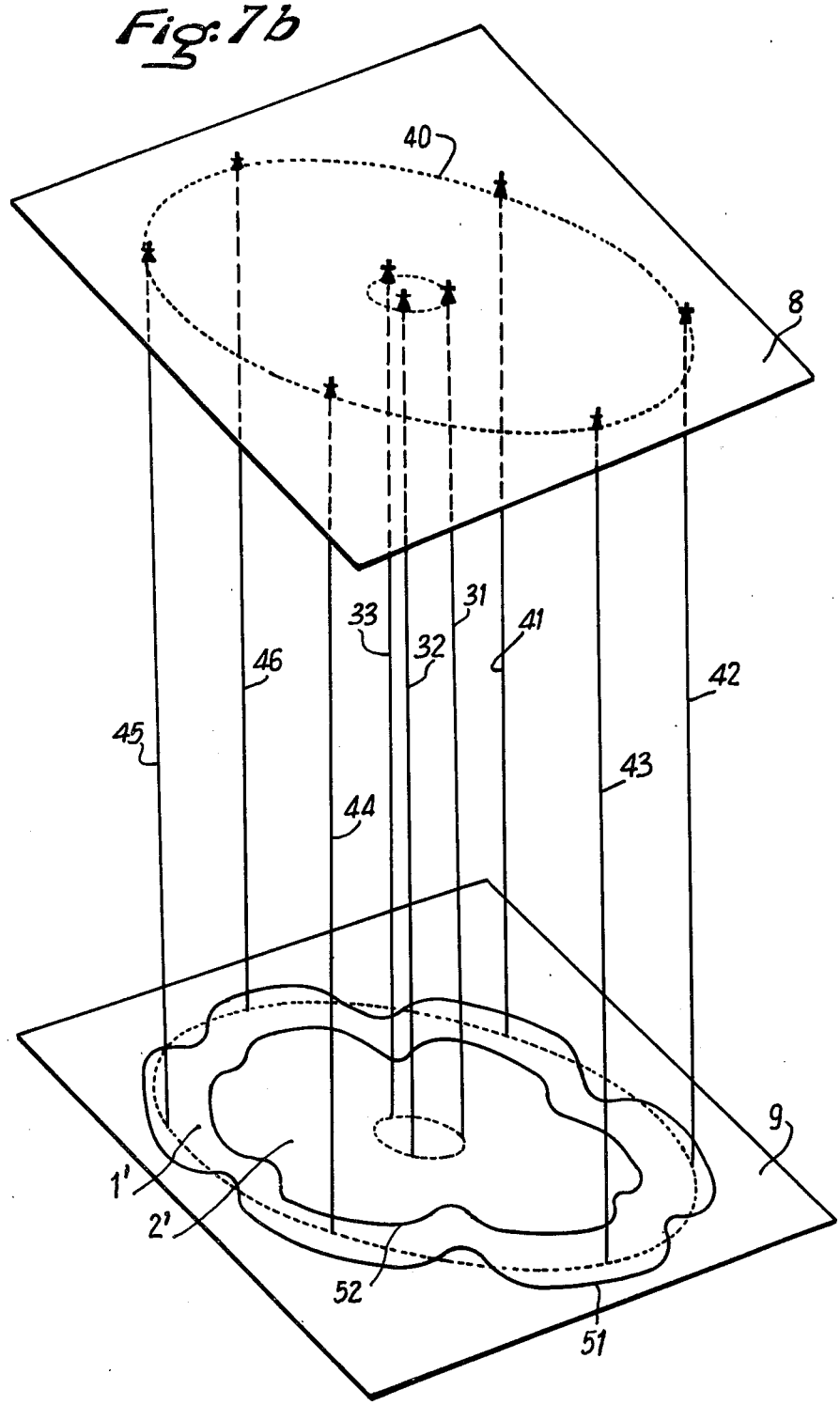

There is shown in FIGS. 7a and 7b (in plan and in perspective) a preferential arrangement of the wells 5 and 9 which is more especially adapted to the storage of large quantities of heat.

In accordance with this arrangement, provision is made for a single "hot-zone" well 5 (or a plurality of "hot-zone" wells 31, 32, 33, 34 disposed in a circle having a diameter which is calculated so as to ensure that said wells behave substantially in the same manner as a single well 34 of large size), said well or wells being placed at the center of the heat storage and recovery system whilst the "cold-zone" wells 41 to 46 are placed on an outer circle 40, the diameter of which is calculated so as to ensure that the heat front does not reach these latter at the end of the storage operation; any one of the "hot-zone" wells can be put into communication with any one of the "cold-zone" wells.

Said wells are preferably arranged so as to form a polygon which is as regular as possible.

In a complete storage process, provision is made for at least six wells 9.

Figure 8:
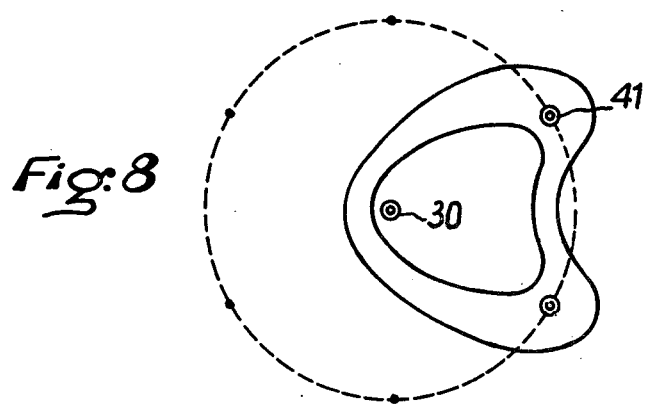
FIG. 8 illustrates an embodiment of the system in accordance with the invention and corresponding to one of the preferential positions of the wells of the "hot" and "cold" zones for small storages of heat.

In FIG. 8, there is shown a preferential arrangement of the wells for carrying out the storage of small quantities of heat.

In accordance with this arrangement, the "cold-zone" wells 41 and 42 are placed at points corresponding to consecutive vertices of a regular polygon at the center of which are placed the "hot" wells 5.

In the case of well arrangements of the type described in the foregoing, it is of interest to note that, by modulating the injection and extraction rates within the "cold-zone" wells, it is thus possible to compensate or correct any possible drift in the storage area which could result from an initial or accidental pressure gradient within the captive layer.

It will be noted in this connection that any correction for drift can also be obtained by replacing the "cold-well" position-location circle 40 by a suitable closed curve which takes into account the corrections to be made.

Curves of this type are defined in polar coordinates by the extremity of a vector which has its origin at the central well of the "hot" zone (or at the center of the group of wells of the "hot" zone). The modulus of said vector is proportional to the mean value of Darcy transmissivity of the storage area along the direction of said vector (it is recalled that the Darcy transmissivity is the product of the Darcy permeability and of the thickness of the layer).

It should be made clear that the mode of initial operation of the system according to the invention which comprises groups of wells arranged as in FIGS. 7a, 7b and 8 consists in injecting water at the return temperature of the distribution network R into the "hot-zone" wells prior to normal exploitation. The quantity of water thus injected should be sufficient to ensure that, at the time of subsequent exploitation, a continuous buffer zone surrounding the "cold-zone" wells is formed between the "hot" zone and the external medium. Exploitation then normally begins with injection of hot water in accordance with the description given with reference to FIGS. 1 to 6.

What we claim is:

1. A system for the storage and recovery of heat through transfer of heat between the porous and permeable rock matrix of a captive layer and the intergranular free water of said layer which is caused to circulate, said system comprising at least one hot well for higher temperature water and at least one cold well for lower temperature water intersecting said layer in spaced relation to each other, conduit means interconnecting said hot and cold wells externally of said layer, said conduit means, said layer and said hot and cold wells defining the primary circuit for the circulation of the water of said layer, reversible pump means for circulating the water of said layer through said primary circuit in either direction, said reversible pump means comprising at least one pump for extracting water from said hot well at such a height that the water pressure at any point of the primary circuit will be maintained at a higher value than the water vaporization pressure for the temperature at the respective point, second closed circuit means for circulating the fluid medium, heat exchanger means for transferring heat between said primary circuit and said secondary circuit and regulating means for regulating the water flow rate and pressure in said primary circuit for both directions of water flow, said regulating means comprising at least one valve for regulating the rate of injection into said hot well in one direction of flow of the water, said valve being mounted at such a height that the water pressure at any point of the primary circuit will be maintained at a higher value than the water vaporization pressure for the temperature at the respective point.

2. A heat storage and recovery system according to claim 1, wherein said pump for extracting water from said hot well is mounted inside said well.

3. A heat storage and recovery system as set forth in claim 1, wherein said pump for extracting water from said hot well is mounted in an underground chamber located approximate to said well.

4. A heat storage and recovery system as set forth in claim 1, wherein said valve for regulating the rate of injection into said hot well is mounted inside said well.

5. A heat storage and recovery system according to claim 1, wherein said valve for regulating the rate of injection into said hot well is mounted in an underground chamber located in close proximity to said well.

6. A heat storage and recovery system as set forth in claim 1, wherein said reversible pump means for circulating the water of said layer further comprises additional pump means located in said cold well.

7. A heat storage and recovery system as set forth in claim 1 wherein said regulatory means further comprises an additional valve operatively connected between said reversible pump means and said heat exchange means.

8. A heat storage and recovery system according to claim 1, wherein said layer constitutes a storage area, at least one hot well being located adjacent the middle of said storage area and the plurality of said cold wells disposed in spaced relation to each other adjacent the periphery of said storage area.

* * * * *